July 16, 1929.  C. A. G. KUIPERS  1,720,736
SIGN

Original Filed Sept. 11, 1926

Inventor
Clarence A. G. Kuipers
by Parker & Carter
Attorneys.

Patented July 16, 1929.

1,720,736

UNITED STATES PATENT OFFICE.

CLARENCE A. G. KUIPERS, OF WINNETKA, ILLINOIS.

SIGN.

Refile for abandoned application Serial No. 134,890, filed September 11, 1926. This application filed May 17, 1928. Serial No. 278,812.

My invention relates to a sign and to supporting means therefor, and has for one purpose the provision of a sign adaptable for use upon the spare wheel or spare tire of an automobile. Another purpose is the provision of such a sign and supporting means therefor and means for adjusting its position in relation to said tire or rim. Other purposes will appear from time to time in the course of the specification and claims.

My invention is illustrated more or less diagrammatically in the accompanying drawings, wherein—

Like parts are indicated by like symbols throughout the specification and drawings.

Figure 1:
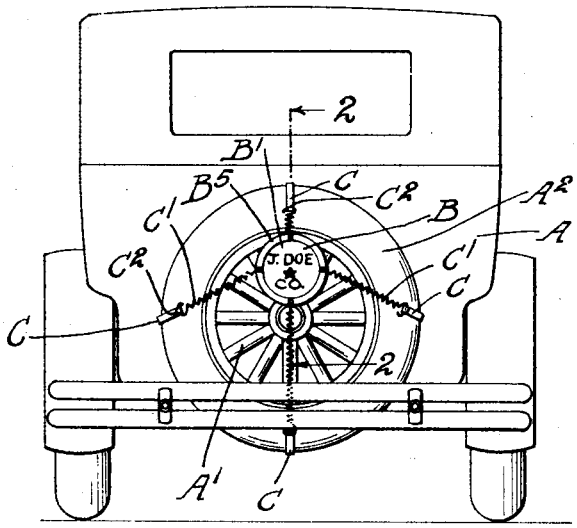
Figure 1 is an elevation.
Figure 2:
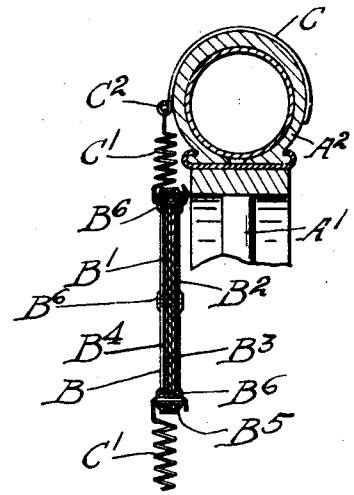
Figure 2 is a section on the line 2—2 of Figure 1.

Referring primarily to Figures 1 and 2, A generally indicates an automobile structure to the rear of which is secured the spare wheel $A^1$ with the tire $A^2$.

B indicates a sign carrier, herein shown as round in form although it may be made of any desirable shape. The carrier includes a layer $B^1$ of transparent waterproof material, a rear layer $B^2$ of waterproof material, a thickening or supporting member $B^3$ and the sign proper $B^4$. These four layers may if desired be surrounded and held together at the edges by any suitable binder or closure $B^5$, the assembly being secured together for example by the grommets $B^6$.

The sign may be supported by the wheel or tire, for example by the employment of a plurality of hooks C which are preferably but not necessarily formed of spring material and so formed and proportioned as to grip or, if desired, partially surround, the tire. These hooks may be secured to the sign, for example by the coil springs $C^1$ hooked into the eyelets $C^2$ of the hooks C, their opposite ends being secured for example to the grommets $B^6$. Thus the sign is held in position by the balanced tension of a plurality of spring elements, and the tension of the spring elements may at the same time be employed to hold the hooks C in position. Obviously, the hooks may if desired be made of such spring material, as positively to grip and hold the tire and thus to hold themselves in position.

Figure 3:
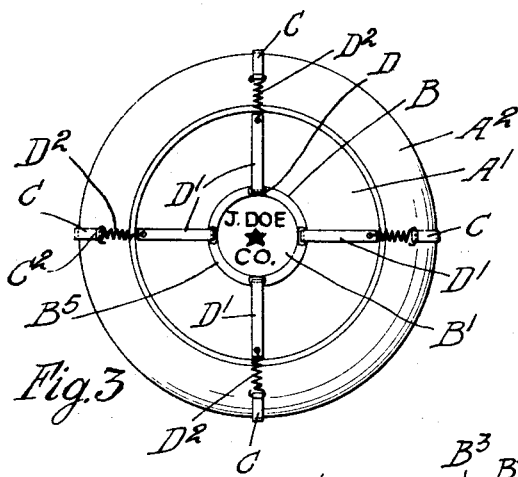
Figures 3 and 4 are elevations of variant forms.
Figure 4:
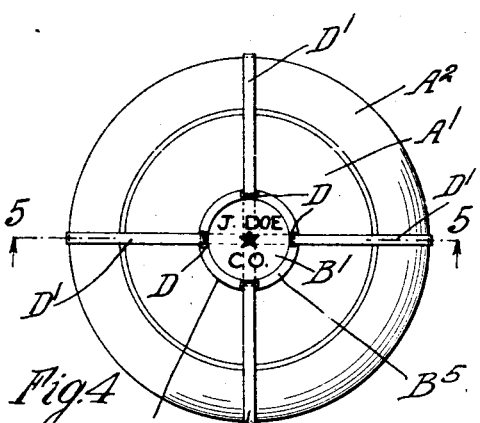
Figure 5:
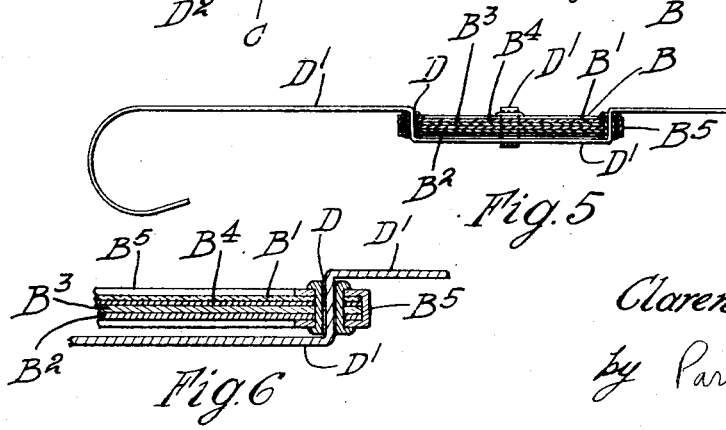
Figure 5 is a section on the line 5—5 of Figure 4.
Figure 6:
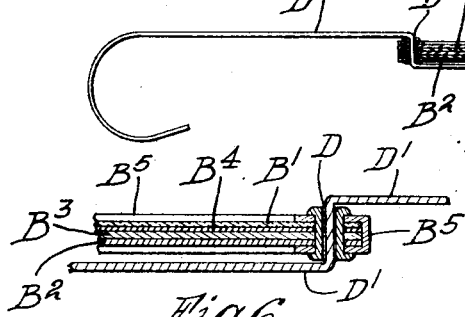
Figure 6 is an enlarged detail section.

Referring to Figures 3 and 4, the sign B instead of being penetrated by grommets, is provided with relatively enlarged slots D through which pass the flexible ribbons or strips $D^1$, of which I illustrate two; in the form shown in Figure 3, I illustrate springs $D^2$ interposed between the ends of the strips $D^1$ and the hooks C. In the form of Figure 4, I dispense with the intermediate spring arrangement and form the ends of the strips $D^1$ to surround the tire and take the place of the separate hook C of the other form.

It will be evident that while I have shown in my drawings an operative device, still many changes might be made in the size, shape, arrangement and disposition of parts without departing materially from the spirit of my invention and I wish, therefore, that my showing be taken as in a sense diagrammatic. The invention is defined in the accompanying claims. The present application is a substitute for the previously filed application No. 134,890 filed on September 11, 1926, and relating to substantially the same material.

The use and operation of my invention are as follows:

In securing advertising material to an automobile, the best place for such advertising is the rear spare wheel or tire. I have therefore devised a type of sign and supporting means therefor which is particularly adaptable for positioning on such tire. In the form of Figures 1 and 3, I illustrate a sign substantially smaller than the tire or wheel which is positioned or centered within the periphery of the tire. The yielding means shown, holds the hooks on the tire and holds the sign firmly in position against the wheel. Under some circumstances the springs may be eliminated as shown in Figure 4.

The forms of Figures 3 and 4, permit adjusting or shifting of the sign in relation to the tire or wheel as soon as it can be slid along the more or less flexible strips $D^1$. In some instances this is important since in many makes of cars the stop lights and license and rear light are positioned within the periphery of the spare rim. It is therefore important that the sign shall be so positioned as not to mask the license or such lights.

I claim:

1. In a sign adapted to be secured to the spare tire or rim of an automobile, a sign member, a plurality of securing members adapted to engage the exterior of the tire and attaching connections between such hook members and said sign, the sign member being slidably mounted in relation to such securing members.

2. In a sign adapted to be secured to the spare tire or rim of an automobile, a sign member, including a sign, a transparent covering for the front thereof, a protecting covering for the rear thereof and means for securing them together by the sign, a plurality of securing members adapted to engage the exterior of the tire and attaching connections between said hook members and said sign, said sign being slidable in relation to said attaching connections.

3. In a sign adapted to be secured to the spare tire or rim of an automobile, a sign member, including a sign, a transparent covering for the front thereof, a protecting covering for the rear thereof and means for securing them together by the sign, a plurality of securing members adapted to engage the exterior of the tire and attaching connections between said hook members and said sign, said sign being slidable in relation to said attaching connections, and being apertured to permit them to pass therethrough.

Signed at Chicago county of Cook and State of Illinois, this 3rd day of May, 1928.

CLARENCE A. G. KUIPERS.